FIG. 1

INVENTOR
James E. Moore
by McDougall, Hersh, Scott
and Ladd
Att'ys

FIG. 2

Feb. 24, 1970    J. E. MOORE    3,497,190
SYSTEM FOR HOT DE-OILING AND HOT BRIQUETTING
Filed April 15, 1968    6 Sheets-Sheet 3

United States Patent Office 3,497,190
Patented Feb. 24, 1970

3,497,190
SYSTEM FOR HOT DE-OILING AND HOT BRIQUETTING
James E. Moore, 1401 Meadow Lane,
Glenview, Ill. 60025
Filed Apr. 15, 1968, Ser. No. 721,474
Int. Cl. F27b *1/10, 9/16*
U.S. Cl. 263—26                                                              8 Claims

ABSTRACT OF THE DISCLOSURE

A system for hot de-oiling and hot briquetting material wherein the material is heated to burn off or vaporize foreign substances and is then optionally transported to a briquetting machine for forming of the material into briquettes. The improvements of the invention relate to furnace constructions and method of operation for heating the material. The furnace constructions include a single hearth or other area providing a combustion zone whereby the material can be fed to the combustion zone from an inlet defined by the furnace. An outlet is defined in the furnace construction, and means are provided for moving the materials within the furnace to the outlet and for delivering the materials to briquetting equipment or for other uses.

---

This invention relates to a system for hot de-oiling and hot briquetting. The invention is particularly concerned with the processing of materials such as crushed turnings, crips, borings, and other metal scrap, for example, those materials consumed in melting shops.

The briquetting of scrap materials such as turnings and borings has been recognized as a highly economical and efficient procedure. Turnings and borings have a composition which makes them highly suitable for use in charging operations in a foundry. These materials are readily available at low cost and, to add to the efficiency, they are often produced in a machine shop near a melting shop.

The turnings and borings have certain drawbacks, however, due the fact that they are very small dimensionally and are usually coated with oil and water. These characteristics make them highly undesirable as additives in a cupola or in an electric furnace.

By hot de-oiling and hot briquetting the turnings and borings, the drawbacks referred to can be overcome. The briquettes produced are of satisfactory size and density so that the original size of the turnings and borings is of not consequence when briquettes are formed for addition to a melting furnace. Similarly, the oil and water on the turnings and borings is vaporized off as a regular step in the briquetting procedure so that the briquetted product will be virtually free of any oil and water traces.

The presence of oil on the turnings and borings presents another distinct advantage during hot briquetting. Thus, the oil serves as a fuel which is consumed as the oil is removed. This provides an ideal means for controlling temperature and non-oxidizing conditions in the combustion zone of a furnace employed for removing the oil. The air-to-fuel ratio within the furnace can be maintained at a desired level to provide a temperature of desired magnitude.

The system of this invention is also designed to eliminate adverse conditions which can arise due to the burning of the oil. Specially, excess oil vapors and smoke can cause highly undesirable air pollution, and afterburner means are provided for burning the excess oil to eliminate this problem. In addition, the discharge from the system can be scrubbed by suitable mechanisms to further reduce the introduction of contaminants into the air.

It is a general object of this invention to provide improvements in hot briquetting and hot de-oiling, particularly with respect to improvements in furnace constructions employed for removing foreign substances such as oil and water from the surfaces of the materials and simultaneously preheating the materials for briquetting or other use.

It is a more particular object of this invention to provide furnace constructions of the type described which are relatively low in cost and which operate with a high degree of efficiency, dependability and economy.

It is a still further object of this invention to provide a furnace design which is particularly suitable for the treatment of discharge from the furnace for purposes of burning excess oil vapor and for avoiding the entrainment of dust in off-gases whereby little or no dust is carried from the furnace to the afterburner, scrubber and/or atmosphere.

These and other objects of this invention will appear hereinafter and for purposes of illustration, but not of limitation, specific embodiments of the invention are shown in the accompanying drawings in which:

The systems of this invention are specifically designed for the processing of material such as turnings and borings. In accordance with prior practice, the turnings and borings are placed in a furnace construction for purposes of burning off foreign substances such as oil from the surfaces of the turnings and borings. The hot materials are then transported to a briquetting machine for forming into briquettes or utilized for other purposes. Although the invention will be described with reference to the treatment of metal, other materials can also be advantageously handled in these systems. For example, ores which have a fuel associated with the material when it is introduced into the furnace can be treated in accordance with the principles to be described.

In prior constructions employed for heating of the turnings and borings, it was thought necessary to provide a carefully constructed furnace which included different zones characterized by distinct operations. Thus, a central zone of such furnaces provided a primary combustion zone into which material to be briquetted was introduced. Means were provided for blowing the material into the furnace to scatter the particles since this was thought necessary to provide sufficient heat transfer.

A supplemental heating zone equipped with burners was located beneath the primary zone. Rakes were provided for gradually moving the material so that the material would eventually drop through the two heating zones.

Above the primary zone, an afterburner was provided. By the introduction of air into this afterburner zone, unburned oil vapors would be burned in the afterburner thereby reducing contamination of the atmosphere. Rakes were utilized in this zone for returning settled dust which collected on the floor of the afterburner chamber.

The instant invention provides systems for accomplishing hot processing of metal pieces in a more economical and efficient manner when compared with prior systems. It has been found that furnaces having a single hearth can be utilized for purposes of heating of turnings and borings to the extent that these materials can be briquetted for use as charge materials or otherwise processed. Costs are materially reduced by eliminating the extra zones since the furnace size will be considerably less. Furthermore, the blowing means and additional raking means can be eliminated.

The single hearth arrangement is particularly suitable in systems where the inlet and outlet openings for the materials are located to provide maximum production rates, minimum installation costs and minimum operational costs. Additional improvements are available where the flow of gases is related to the feed and raking direction to provide maximum efficiency. Finally, the arrangement permits relatively low operating temperatures, low gas velocity, minimum agitation of dust on the hearth and minimum entrainment of dust in the exhaust.

Figure 1:
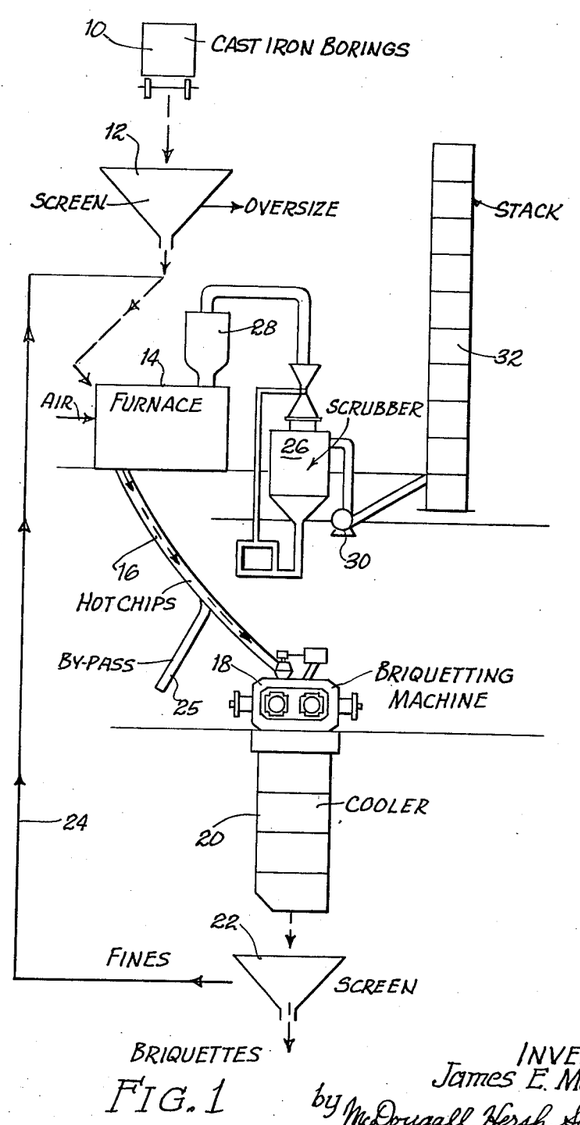
FIGURE 1 is a schematic illustration of a hot briquetting system of the type contemplated by this invention.

FIGURE 1 comprises a schematic illustration of a system for hot briquetting. In this system, cast iron borings are transported, as shown at 10, to a sizing screen 12. The screen 12 removes over-sized material whereby the material fed to the furnace 14 and the product of the furnace will be of relatively uniform dimension.

The hot chips are delivered from the furnace through line 16 to a briquetting machine 18. The briquettes produced by the briquetting machine are transported through a cooler 20 and are then passed across a screen 22. The fines comprising particles which are separate from the briquettes are fed back as shown at 24 for re-cycling through the furnace. In the event that the discharge from the furnace is not to be briquetted, a by-pass 25 is provided in line 16.

A scrubber 26 is provided for collecting the gases issuing from the furnace through afterburner 28. A pump 30 withdraws the gases from the scrubber for passage through a stack 32 into the atmosphere.

Figure 2:
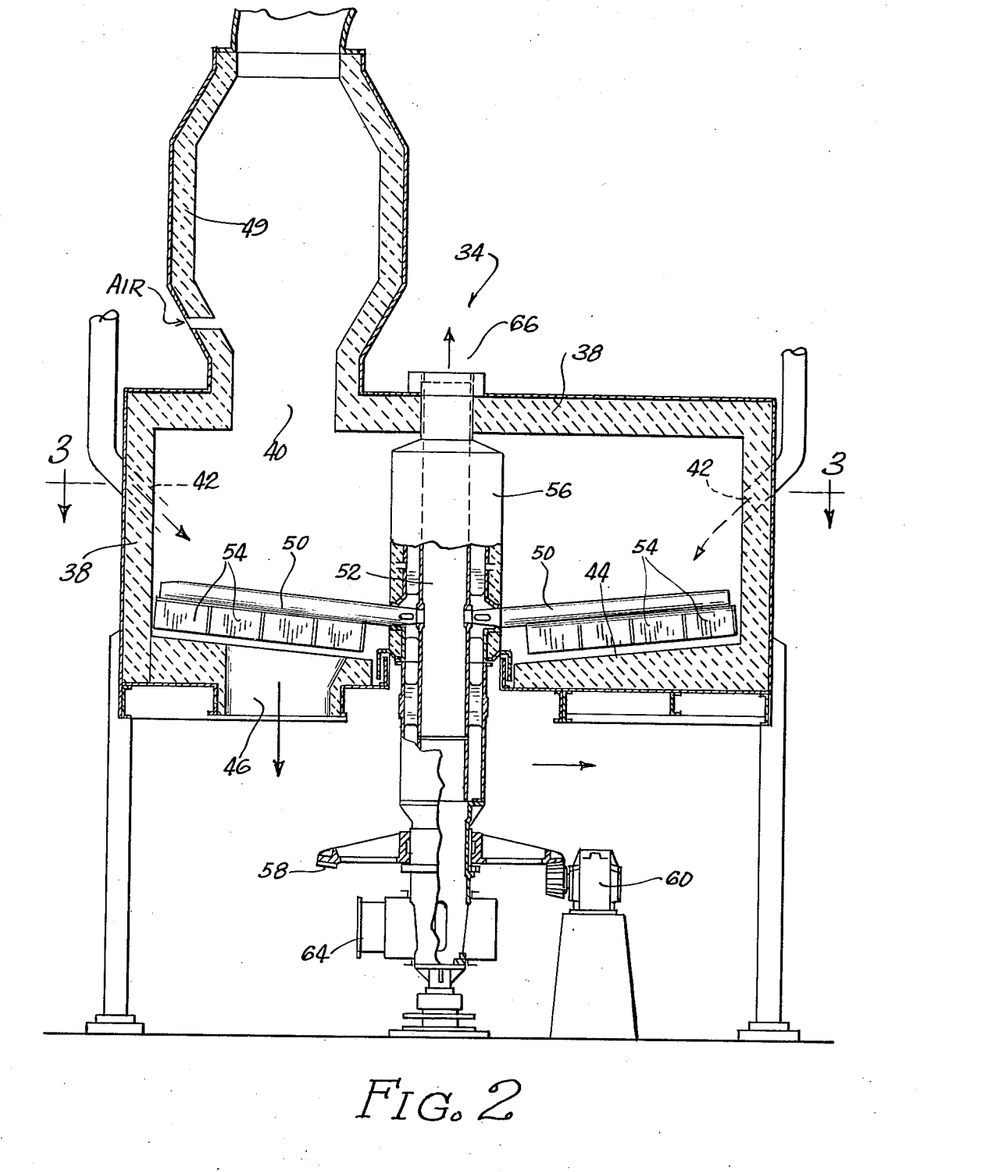
FIGURE 2 is a vertical sectional view of one furnace construction suitable for use in a briquetting system of the type shown in FIGURE 1.
Figure 3:
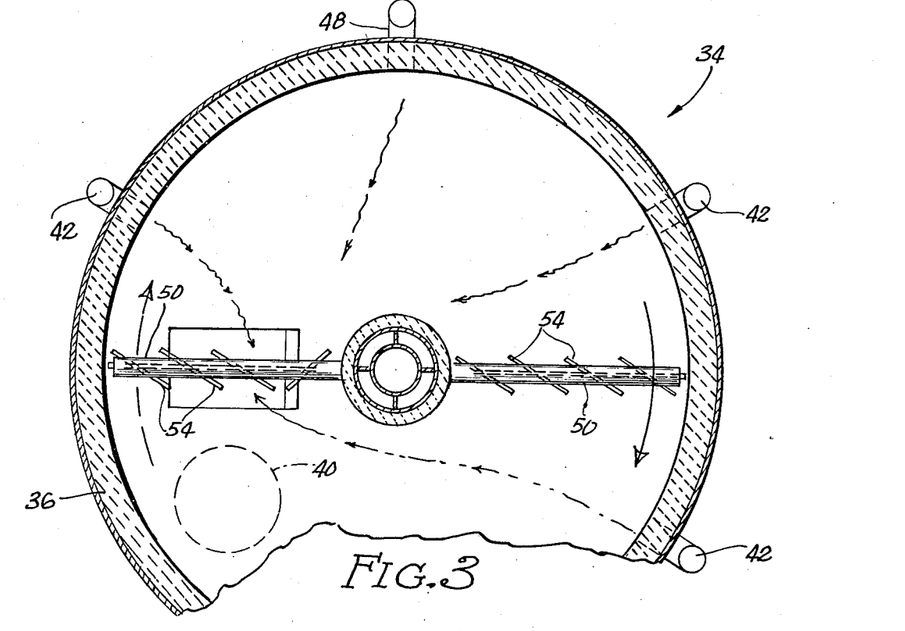
FIGURE 3 is a horizontal sectional view taken about the line 3—3 of FIGURE 2.

FIGURES 2 and 3 illustrate one form of furnace construction suitable for use in a system of the type described. The furnace 34 comprises a side wall 36 and top wall 38. An opening 40 is provided in the top wall for the discharge of gases. Inlet openings 42 are defined by the side wall 36 so that material such as turnings and borings can be fed in and deposited on the hearth 44. A rake system is provided for moving the material over the hearth for ultimate discharge of the material at the outlet 46.

As the material is fed into the furnace, the oil carried with the material ignites and burns off. This burning action serves to maintain a desired heat level within the furnace and, therefore, the operation is substantially self-sustaining. Air is introduced into the furnace through the openings 42 along with the material to be heated. Additional ports such as shown at 48 in FIGURE 3 can be provided for the introduction of additional amounts of air. By regulating the amount of air introduced into the furnace, the temperature can be controlled within desirable limits.

Openings such as shown at 48 can also be provided for the introduction of additional amounts of material at different points around the hearth. The use of a plurality of openings for introducing material can increase the capacity of the system. Thus, the material introduced tends to ignite over that portion of the hearth immediately adjacent the point of introduction. By providing a plurality of inlets, the combustion can be conducted at several points thereby taking maximum advantage of the hearth surface.

As indicated, multiple air inlet openings can be utilized, and these may be the same openings as are provided for material introduction. It is also contemplated that a gap might be formed all around the periphery of the furnace to provide a constant flow of air for supporting combustion. In this connection, the construction of FIGURES 2 and 3, as well as the constructions in FIGURES 4 through 7 and 9 through 11 are designed to provide air flow which keeps disturbance of the materials in the furnace at a minimum. This is highly important from the standpoint of reducing the amount of dust entrained in the exhaust gases. Thus, the introduction of air at several points around the periphery eliminates the need for high pressure and high velocity air streams so that substantial dust will not be raised.

The air flow pattern in the system of FIGURES 2 and 3 is also of importance. The air entering the inlets 42 and 48 will support burning, and the gases produced will then be directed toward the outlet 40. As suggested by the air flow lines in FIGURE 3, the movement of the gases will be across the hearth whereby the hot gases will pass over and through material as they move to the outlet whereby the heating ability of these gases can be utilized. This greatly increases the operating efficiency of the construction.

The outlet 40 communicates with the afterburner 49 to reduce or eliminate the presence of unburned oil vapors in the exhaust gases. The exhaust gases can be passed to a scrubber as suggested in FIGURE 1 before being removed into the atmosphere.

The rake system referred to comprises a pair of arms 50 extending outwardly from a rotating shaft 52. Blades 54 are carried by each of the arms, and the blades pass closely adjacent the upper surface of the hearth. The shaft 52 rotates in a clockwise direction whereby blades 54 will sweep material around the furnace from the area of the inlets 42 and 48 to the discharge opening 46. Additional rake structures may be provided if desired.

The shaft 52 is enclosed within an insulated housing 56. A gear 58 is attached at the lower end of the shaft, and this gear is driven by motor 60 to provide the desired rotation of the rakes. Internal air cooling is provided around the shaft 52 to maintain the shaft at a desired temperature. The air is introduced at 64 and withdrawn at 66 after circulation around the shaft. Provision may also be made for circulation of the cooling air through arms 50.

An auxiliary burner is preferably associated with the furnace 34, for example, in the area of the inlets 42 or 48. The auxiliary burner will provide initial combustion when the operation is started, and it can be used during the operation in instances where the oil or other combustible material associated with the feed is not alone sufficient to support complete combustion. Auxiliary burners are also preferably associated with each of the installations to be described herein.

Figure 4:
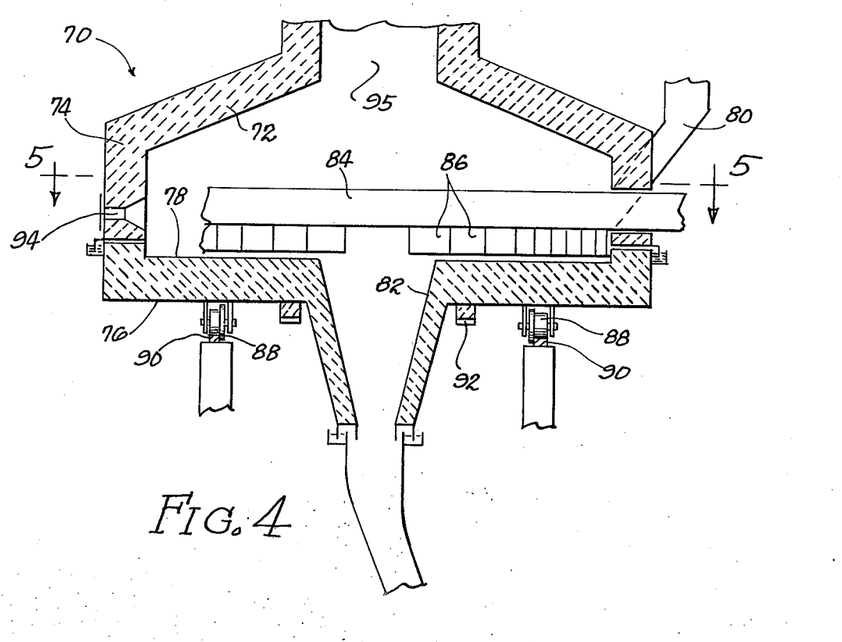
FIGURE 4 is a vertical sectional view of an alternative form of furnace construction.
Figure 5:
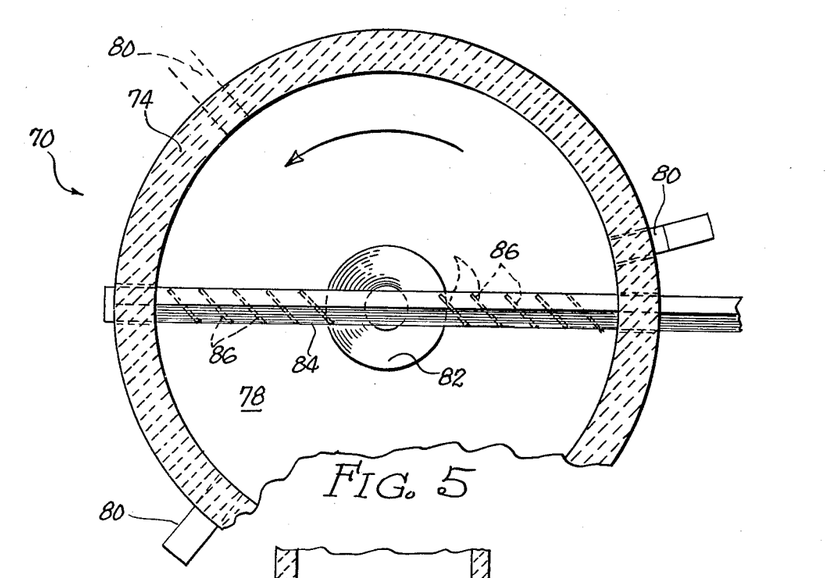
FIGURE 5 is a horizontal sectional view taken about the line 5—5 of FIGURE 4.

FIGURES 4 and 5 illustrate an alternative furnace construction 70. This construction includes a top wall 72, side wall 74 and bottom wall 76 which defines the hearth 78. In this construction, inlets are provided at 80 whereby material can be passed through the side wall 74 and placed on the hearth 78. An outlet opening 82 is defined at the center of the hearth, and rake means 84 provides for movement to material from a position adjacent the side wall to the center of the hearth for discharge through the opening 82.

The rake 84 consists of a supporting arm extending completely over the hearth with blades 86 being attached to the arm, and extending into proximity with the hearth surface. The bottom wall 76 of the furnace is rotatably mounted relative to the side walls. Wheels 88 are attached to the bottom wall, and these wheels ride on tracks 90. A gear 92 is attached to the underside of the bottom wall 76 whereby motor means can be provided for rotation of the bottom wall. It will be appreciated when considering the attitude of the blades 86, shown in FIGURE 5, that the rotation of the hearth will result in movement of the material being heated toward the outlet 82.

The rake 84 extends completely across the furnace in the embodiment shown. It will be appreciated, however, that the rake need only extend from one side wall to the edge of the opening 82 with a cantilever support being provided. Additional rakes could also be utilized if desired.

Air inlet openings are defined by the side wall of the furnace as shown at 94. A plurality of such openings may be provided, and each opening may include a valving means for control of the amount of air introduced. As previously indicated, additional openings or the same openings may also be utilized for the introduction of additional amounts of material.

In this construction, it will be apparent that the air entering through inlets 94 will support combustion adjacent the periphery of the hearth and the resulting gases will then be transported across the hearth and upwardly through outlet 95. The hot gases will, therefore, serve to maintain the material at high temperatures when the material is discharged. An afterburner may be provided beyond the outlet 95 for use in the manner previously described.

Figure 6:
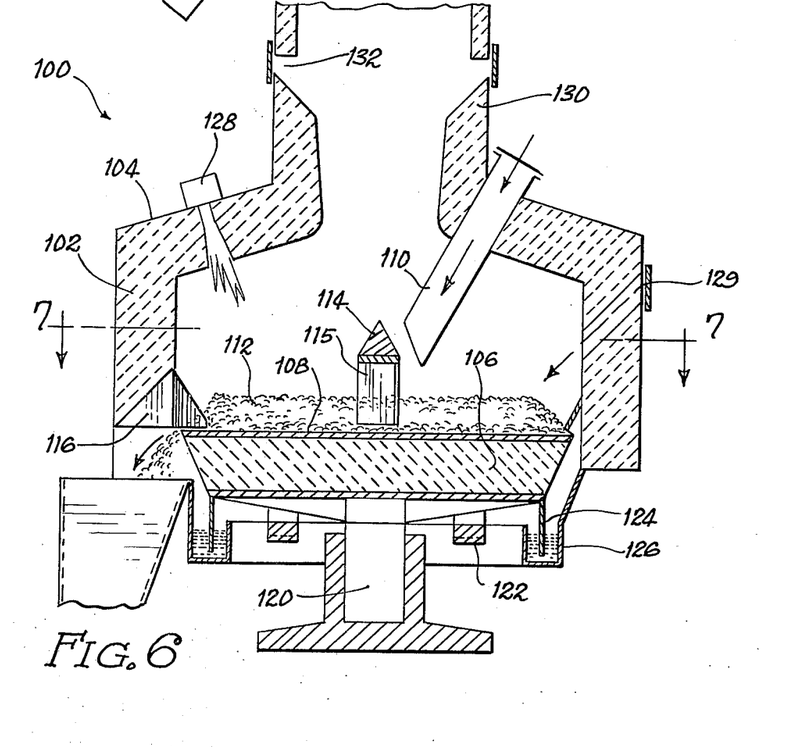
FIGURE 6 is a vertical sectional view of a further alternative form of the invention.
Figures 7, 8:
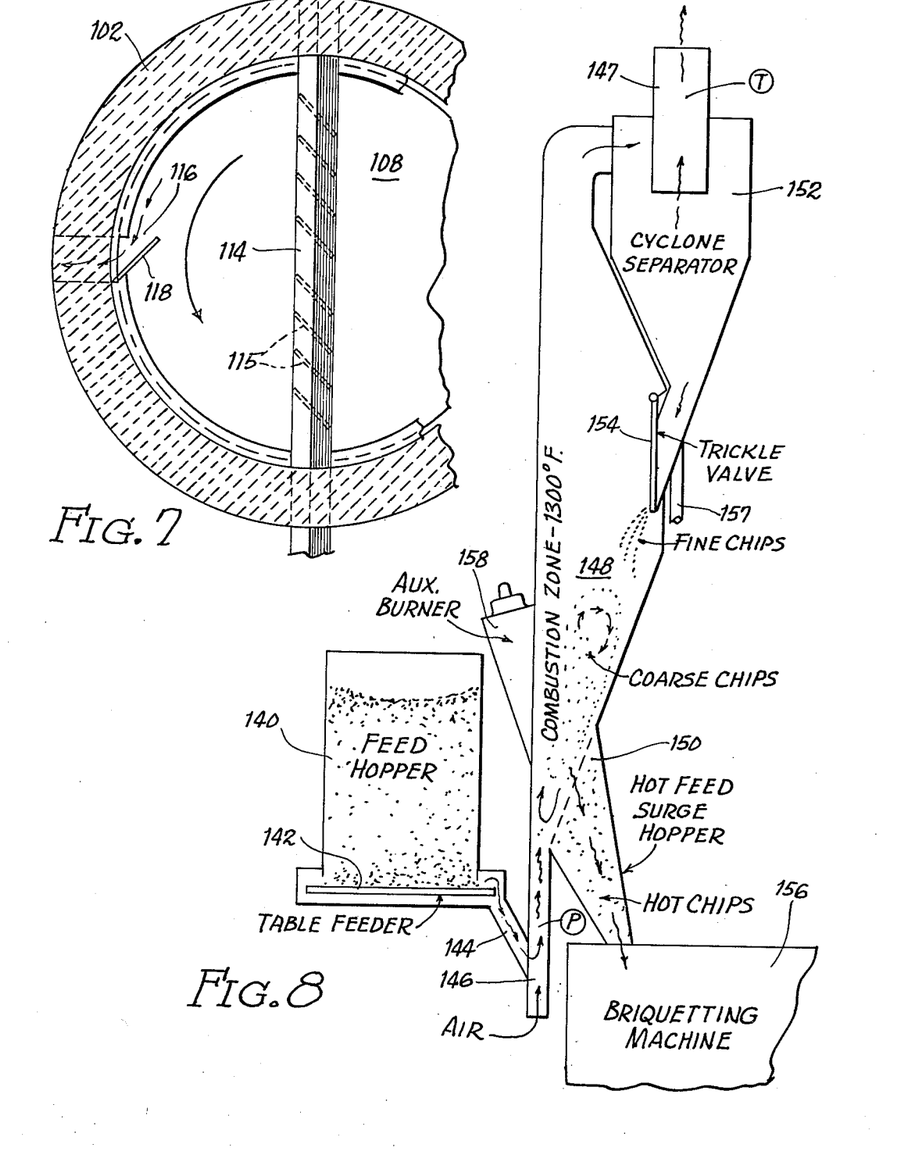
FIGURE 7 is a horizontal sectional view taken about the line 7—7 of FIGURE 6.
FIGURE 8 is a schematic illustration of a still further alternative form of furnace construction; and, FIGURES 9 through 11 are vertical sectional views of additional alternative forms of the invention.

FIGURES 6 and 7 illustrate a furnace construction 100 comprising a further alternative form of the invention. This construction defines a side wall 102, top wall 104 and a bottom wall 106 which defines the hearth 108. Material is introduced through the chute 110 which extends through an opening in the top wall, and which terminates adjacent the center of the hearth. The material builds up on the hearth as shown at 112 and is driven outwardly toward the side of the furnace by means of the rake structure 114 which includes blades 115. As the material enters, it contacts material previously introduced, and this serves to ignite the new material.

An outlet 116 is defined in the side wall 102. A baffle plate 118 serves to direct material on the extreme outer edge of the hearth through this outlet opening. The hearth itself is mounted on a shaft 120 and is rotated through gear 122 attached to the bottom of the hearth. A skirt 124 extends downwardly from the bottom of the hearth, and this skirt is received within a trough 126. This arrangement provides a seal whereby gases cannot be passed into the furnace from beneath the hearth. Similar arrangements should be provided for each structure disclosed herein to avoid such passage of gas into the furnace, and also to avoid passage of the gases out of the furnace.

Inlets 110 and 128 are provided for introducing gases into the furnace to support combustion. An auxiliary burner 129 is used for ignition and for sustaining temperature. An upper section 130 of the furnace defines an outlet for gases resulting from burning. An air inlet 132 is provided in this passage whereby additional air will be provided to enable complete combustion of the gases. As previously indicated, this afterburner arrangement greatly reduces the possibility of contamination of the surrounding atmosphere, and an arrangement of this type is preferably employed in all systems described herein.

FIGURE 8 illustrates an additional system for heating of materials such as turnings and borings. This system includes a feed hopper 140 which may be provided with material from a screen such as shown at 12 in FIGURE 1. A table feeding means 142 delivers the material in the hopper to passage 144 where the material falls downwardly into communication with passage 146. A relatively high velocity air stream is moving in the passage 146, and the material is entrained within this air stream and is carried upwardly into the combustion zone 148.

It will be noted that the passage 146 is relatively narrow; however, the cross section of the combustion zone gradually increases whereby the pressure exerted by the air stream on the chips and borings will be correspondingly reduced. This reduction in pressure will result in return movement of some of the material, particularly the coarser pieces, and a discharge chute 150 is provided for collecting this material. Furthermore, the recycling of hot chips ignites the new chips which are introduced. An equilibrium condition will tend to be established since the build-up of material being fed in by the air stream will also tend to cause discharge of material through the chute 150. The passage 146 and combustion zone 148 may define an oval, rectangular or circular cross section, and the inlet for the chute 150 may extend substantially completely across the tapered side to provide for maximum collection of chips which have been exposed to the combustion zone.

A pressure detecting means of any suitable design may be inserted in the passage 146 as indicated at P in FIGURE 8. The weight of the material above the pressure indicating means can thereby be measured, and the feed rate of material from the hopper can thereby be controlled. A temperature detecting means may be provided at T in the outlet 147. This detecting means can be associated with a control for the air flow into the passage 146. Thus, as the temperature builds up, th eair flow can be reduced to decrease the combustion rate.

The construction of FIGURE 8 may also include a cyclone separator 152 which will receive the gas stream along with the finer particles. The cyclone separator is designed so that the finer particles will pile up at the bottom of the separator adjacent the door 154 which acts as a trickle valve. Ultimately, the finer particles will pass back into the combustion zone, and at least portions will be collected in the chute 150 for ultimate passage to the briquetting machine 156. Alternatively, these particles could be directed through line 157 into the briquetting machine.

An auxiliary burner 158 is attached to one side wall of the construction in the vicinity of the combustion zone. The auxiliary burner operates to begin combustion as the initial material is fed into the combustion zone. Once combustion has been initiated, the fuel provided by the oil on the materials will usually eliminate the need for any auxiliary burning apparatus, although the burner is available for this purpose. An afterburner is also preferably provided for receiving the discharge from stack 147.

Figure 9:
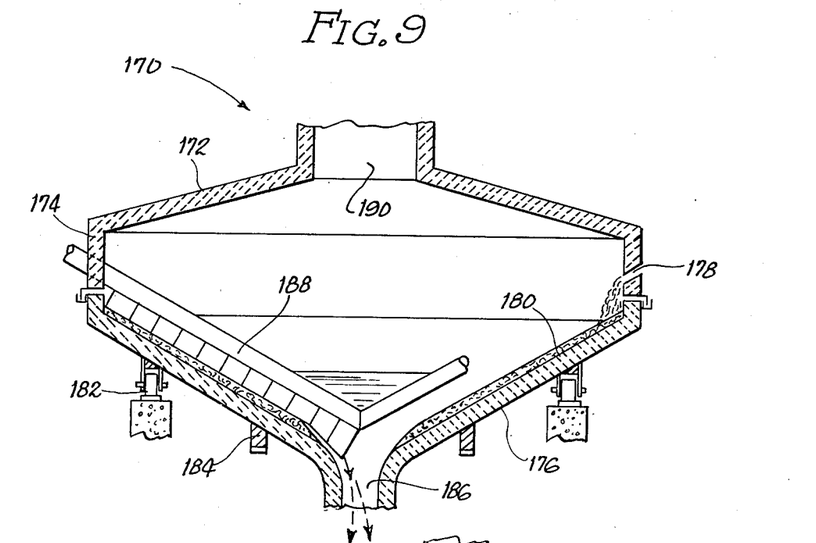

FIGURE 9 illustrates a construction 170 similar to that shown in FIGURE 4. The construction includes the top wall 172, side wall 174 and bottom wall 176. The material is introduced through openings 178 defined in the side wall and combustion takes place on the hearth 180. The hearth is supported on rollers 182, and is rotated through gear 184.

The hearth defines a substantial incline whereby the material on the hearth will move readily toward the outlet 186, aided by a rake structure 188. Gases are discharged from the construction through outlet 190 in the manner previously described.

Figures 10, 11:
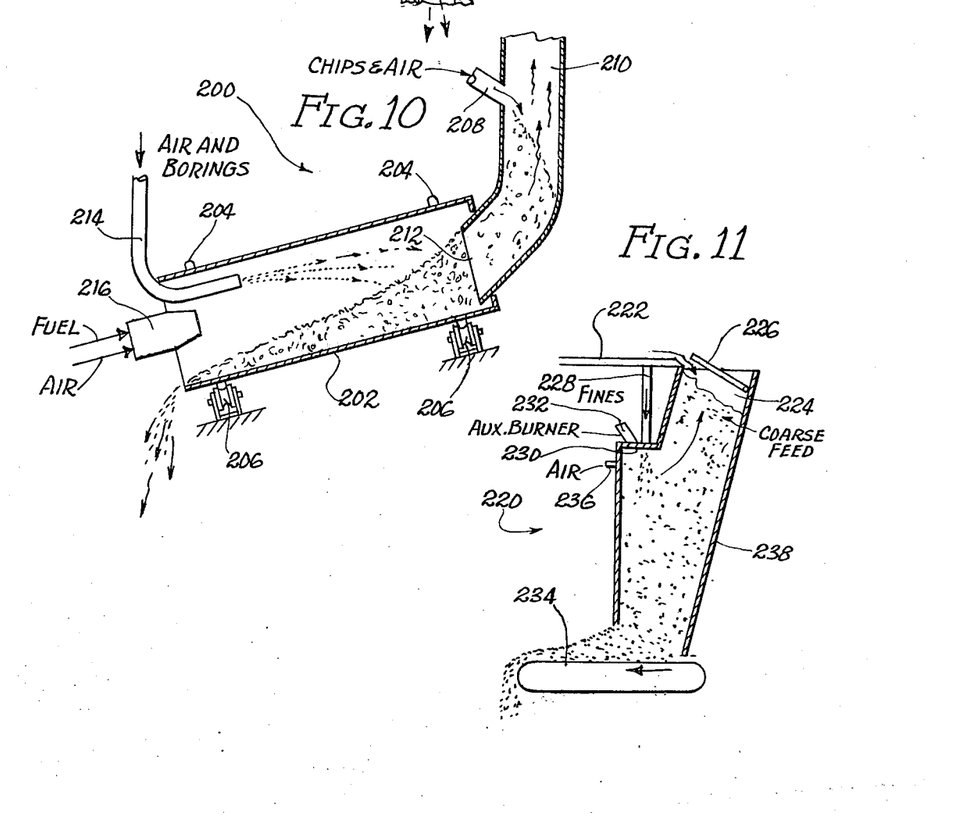

FIGURE 10 illustrates a modified construction 200 which includes a rotating cylinder 202. The cylinder defines a pair of tracks 204 which engage rollers 206. Suitable drive means, now shown, are provided for rotating the cylinder 202. Material is introduced through a line 208 which communicates with chute 210. The material will naturally move downwardly toward the outlet 212 of the chute at which time the material is received in the cylinder 202. Air and small particles are introduced into the cylinder 202 through the pipe 214. The small particles introduced through the pipe 214 may comprise borings from a machine shop, and they carry oil whereby combustion will occur within the cylinder 202. An auxiliary burner 216 is provided for initially igniting the material introduced through the pipe 214. This burner may also be utilized for supplementing burning throughout the operation of the construction in the event that fuel on the particles is not sufficient.

The chips introduced at 208 are preferably larger and heavier particles which will not be entrained in the exhaust gases. The exhaust gases will, however, heat up these chips, and at some point in their travel, the chips, which may also be covered with oil, will be ignited. The mass of chips serves as a filtering means to prevent entrainment of small particles in the exhaust while the combustion gases from the cylinder 202 serve to preheat the chips introduced into the system.

By locating the cylinder 202 on an incline, a natural flow of product will result. Obviously, auxiliary means for removing material from the rotary furnace could be provided.

It will be appreciated that the preheating of the material introduced into the chute 210 could result in vaporization of oil whereby this oil would not be available as fuel. For this reason, the material introduced through the pipe 214 is intended as the material which will provide the fuel necessary for the operation. Some oil may be provided by the material entering through the inlet 208; however, this material may also comprise chunks of material which are to be incorporated in a briquetted product or heated for other purposes, and which does not have any fuel introduced along with it.

FIGURE 11 illustrates the construction 220 which operates in a manner similar to the construction 200. In this instance, the feed is provided by means of a screening conveyor 222. The coarse portions of the feed will move to the end of the screening conveyor for entry through the opening provided between the upper end of the chute 224, and the adjustable damper 226. The fines sift through the conveyor 222 for passage through line 228 to an opening provided in the wall section 230 of the construction. An auxiliary burner 232 is preferably located at the point of entry of these fines.

In the operation of the construction 220, the fines bearing oil will ignite as they enter the construction, and this will provide heat for passage out through the opening provided in the section 224. Since the coarse material will be subjected to this heat, portions of oil will be removed through vaporization. Any remaining oil on the coarse material will ignite as the material moves downwardly into the combustion zone. A conveyor 234 is provided at the bottom of the construction for continuously removing material from the construction. Air may be introduced at 234 to insure that sufficient air will be available to support the necessary combustion.

The construction of FIGURE 11 is provided with an inclined wall 238; however, a vertical arrangement is also contemplated. Obviously, the configuration of the construction of FIGURE 11 as well as that of the other constructions described could be varied considerably while still achieving the results to be accomplished.

In all of the systems described, the aim is to provide a high furnace capacity in the sense that the tonnage per hour of production is high relative to the size of the furnace. Rates of 30 tons per hour are obtainable without difficulty in such constructions.

The high capacity is possibly due to the fact that the oil associated with the particles will ignite immediately adjacent the particle surfaces. This provides for high heat transfer, and thus rapid heating of the particles so that the particles can be moved through the constructions at a high rate.

These results can be accomplished without the need for introducing the particles of material in a stream of air under high pressure. In the construction of FIGURES 4 and 5, for example, the materials are introduced through an inlet 80 under the influence of gravity, and they simply drop onto the surface of the hearth. Since there is no agitation of the materials, the stirring up of dust can be kept to a minimum so that there will be a low incidence of dust entrainment in the exhaust gases.

All of the units described can be readily provided with afterburner constructions, scrubbers, and other pollution control means. The ease with which these facilities can be applied is an extremely important feature from the standpoint of installation costs.

An additional benefit arises from the fact that a reducing atmosphere or an atmosphere low in oxidizing ingredients is provided in all instances. Thus, the air which is introduced into the combustion zone is controlled to provide only enough air to support combustion. The hot particles are thereafter only exposed to the combustion gases which contain little or no oxygen whereby oxidation of the particles ca be virtually eliminated. Excess air is only introduced in the afterburner zone of the various constructions.

It will be understood that various changes and modifications may be made in the above described systems which provide the characteristics of this invention without departing from the spirit thereof.

That which is claimed is:

1. In a system for heating a mass of small, individual metallic pieces carrying foreign substances at least part of which are combustible whereby the burning of said substances assists in the heating of the metallic pieces, and for forming the hot metallic pieces into briquettes, the improvement comprising a furnace construction for heating the metallic pieces, said furnace construction including a single hearth, at least one inlet opening defined above said hearth whereby said pieces and air can be placed directly onto the hearth where combustion occurs, said inlet opening being defined in a side wall of the furnace construction, a first outlet defined by the furnace construction, said first outlet being defined at approximately the center of said hearth, rake means for moving said pieces over the surface of said hearth to said first outlet, said rake means defining blades operating to progressively drive said pieces from adjacent the side of the furnace construction across said hearth to said first outlet at the center of the hearth, and a second outlet defined by said furnace construction, the gases resulting from said combustion passing out of said furnace through said second outlet, said second outlet being in laterally spaced relationship to said inlet whereby said gases flow across material on said hearth from combustion areas to said second outlet, a briquetting machine, and including means connected to said construction for delivering said metallic pieces from said first outlet directly to said briquetting machine for thereby forming briquettes made up of large numbers of said pieces.

2. A system in accordance with claim 1 wherein said hearth is mounted for rotary movement about a centrally located vertical axis, and wherein said rake means are stationary whereby the raking action is achieved through movement of the hearth relative to the rake means.

3. A system in accordance with claim 1 wherein said hearth is inclined downwardly from said side wall to said first outlet.

4. A system in accordance with claim 1 including an afterburner communicating with said second outlet, said gases pass into said afterburner, and means for introducing air into the afterburner for burning of uncombusted portions of said gases.

5. A system in accordance with claim 1 wherein a plurality of inlet openings for said material are defined in the side wall of the furnace at different locations around the periphery of the furnace whereby combustion occurs at said locations, and wherein said second outlet is located above said first outlet whereby the gases resulting from the combustion flow from the side wall of the furnace toward the center of the furnace.

6. A method for heating a mass of small, individual metallic pieces in a furnace construction wherein the pieces carry foreign substances at least part of which are combustible whereby the burning of said substances assists in the heating of the pieces, the improvement comprising the steps of continuously introducing said pieces through inlet means located adjacent the side wall of the furnace construction directly into a combustion zone adjacent the inlet means whereby the combustible substances in the pieces are ignited by hot pieces previously introduced in the combustion zone, providing a first outlet for said pieces at the center of the furnace construction and progressively moving the pieces introduced toward said outlet, providing a second outlet for the combustion gases, said second outlet being located at the center of the construction whereby the combustion gases move across and in contact with said materials as they progress toward said second outlet, providing a briquetting machine in direct association with said first outlet, delivering hot pieces to said briquetting machine, and formng said hot pieces into briquettes made up of a plurality of such pieces.

7. A method in accordance with claim 6 including the step of providing an afterburner in association with said second outlet for burning uncombusted portions of said combustible substances.

8. A method in accordance with claim 6 wherein air is introduced into the combustion zone along with said pieces, the amount of air introduced being controlled to provide approximately the amount necessary to support combustion whereby oxidizing conditions in the area of the combustion zone are minimal.

References Cited

UNITED STATES PATENTS

| | | | |
|---|---|---|---|
| 2,026,622 | 1/1936 | Fleming | 263—26 X |
| 2,246,224 | 6/1941 | Streander | 110—8 X |
| 2,676,006 | 4/1954 | Martin | 263—26 |
| 3,087,443 | 4/1963 | Attanasio et al. | |
| 3,352,259 | 11/1967 | Salmon | 110—18 |
| 3,412,985 | 11/1968 | Perry et al. | 110—18 X |

JOHN J. CAMBY, Primary Examiner

U.S. Cl. X.R.

110—18